US012625710B2

(12) United States Patent
Rau

(10) Patent No.: US 12,625,710 B2
(45) Date of Patent: May 12, 2026

(54) PRESENTING CONTENT IN MULTIPLE TABS FOR SCROLL-FREE VIEWING ON A MOBILE DEVICE

(71) Applicant: Notion Labs, Inc., San Francisco, CA (US)

(72) Inventor: Varun Rau, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 335 days.

(21) Appl. No.: 18/411,340

(22) Filed: Jan. 12, 2024

(65) Prior Publication Data

US 2025/0231773 A1 Jul. 17, 2025

(51) Int. Cl.
G06F 9/451 (2018.01)
G06F 3/0483 (2013.01)
G06F 40/40 (2020.01)

(52) U.S. Cl.
CPC .............. G06F 9/451 (2018.02); G06F 40/40 (2020.01); G06F 3/0483 (2013.01)

(58) Field of Classification Search
CPC ................................. G06F 9/451; G06F 40/40
See application file for complete search history.

(56) References Cited

U.S. PATENT DOCUMENTS

| | | | |
|---|---|---|---|
| 2005/0138567 A1* | 6/2005 | Smith | G06F 9/451 715/763 |
| 2013/0227398 A1* | 8/2013 | Bolstad | G06F 40/106 715/236 |
| 2018/0314678 A1* | 11/2018 | Jaquish | G06F 9/451 |
| 2020/0110792 A1* | 4/2020 | Tsabba | G06F 3/167 |
| 2020/0134099 A1* | 4/2020 | Momchilov | G06F 3/0486 |

* cited by examiner

*Primary Examiner* — Daniel Samwel
(74) *Attorney, Agent, or Firm* — Perkins Coie LLP; Alberto Araiza; Lena Petrovic

(57) ABSTRACT

The disclosed system receives an indication to create tabs in a GUI and creates a hierarchical data structure including a root node and a first child node. The hierarchical data structure represents the tabs having multiple permissions, the root node represents the tabs, and the first child node associated with the root node represents a tab among the tabs. The system creates the tabs that are visible without scrolling on a mobile device screen. The system receives an indication of content to include in the tab and creates a second child node including the content by formatting the content to be visible without scrolling on the mobile device screen. The first child node is a parent of the second child node including the content. The system provides the tabs and the content in the GUI, where viewing the content on the mobile device screen does not involve scrolling.

20 Claims, 11 Drawing Sheets

Input

[232]
[302]
[12]
[875]                202

{ ⋯ }                204

[.........]
[.........]            206
[.........]
[.........]

212
Encoder 208

214

Decoder 210

[423]
[203]
[12]                216
[564]

Output

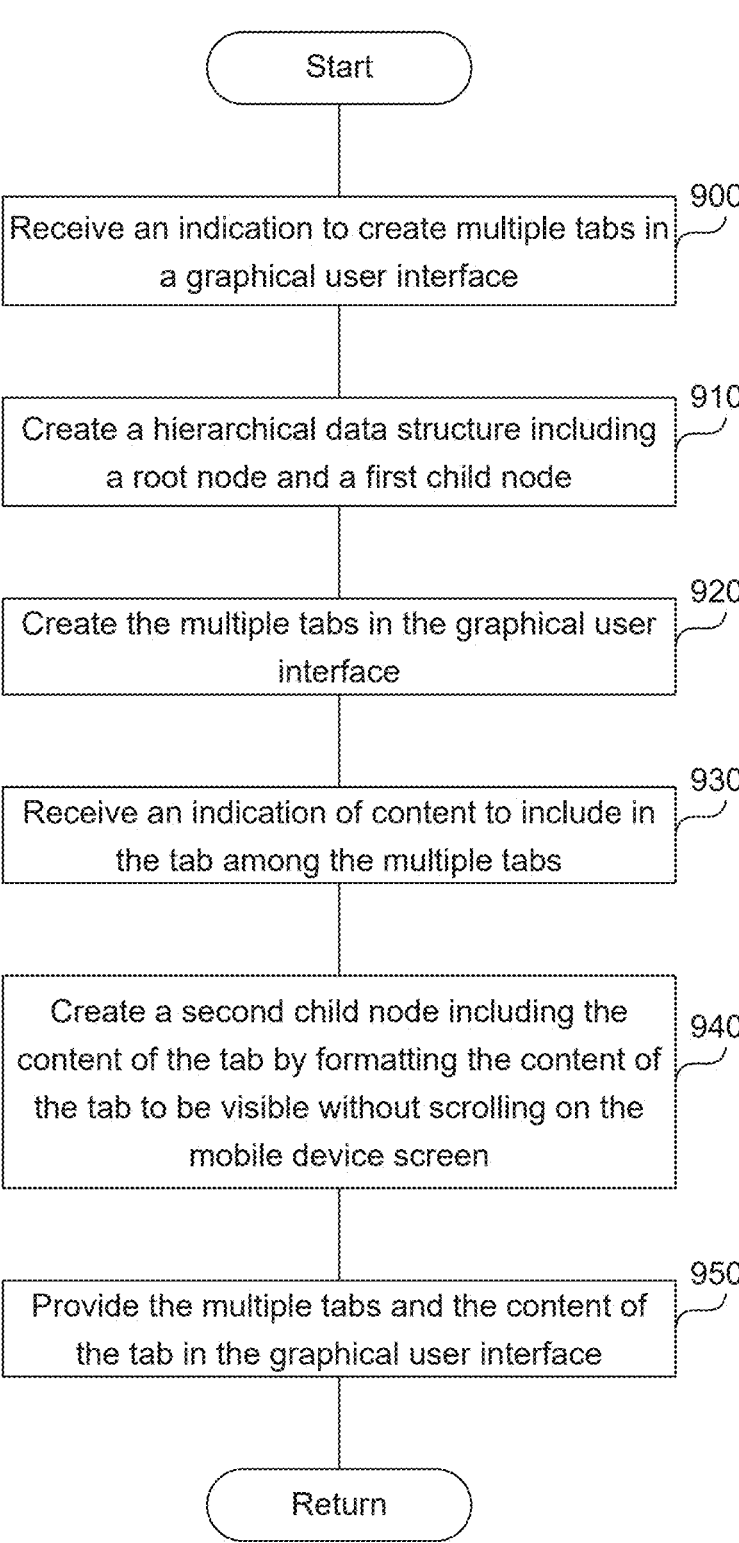

Start

Receive an indication to create multiple tabs in a graphical user interface    900

Create a hierarchical data structure including a root node and a first child node    910

Create the multiple tabs in the graphical user interface    920

Receive an indication of content to include in the tab among the multiple tabs    930

Create a second child node including the content of the tab by formatting the content of the tab to be visible without scrolling on the mobile device screen    940

Provide the multiple tabs and the content of the tab in the graphical user interface    950

Return

*FIG. 9*

PRESENTING CONTENT IN MULTIPLE TABS FOR SCROLL-FREE VIEWING ON A MOBILE DEVICE

BACKGROUND

Mobile device screens have limited space compared to traditional monitors, and, consequently, viewing content on mobile device screens can be cumbersome. In particular, viewing content on mobile device screens can involve scrolling horizontally or vertically, creating difficulties for the user to determine the continuity of text during scrolling.

BRIEF DESCRIPTION OF THE DRAWINGS

Reference will now be made, by way of example, to the accompanying drawings, which show example embodiments of the present application and in which:

FIG. 9 is a flowchart of a method to present content in multiple tabs for scroll-free viewing on a mobile device.

Figure 1:
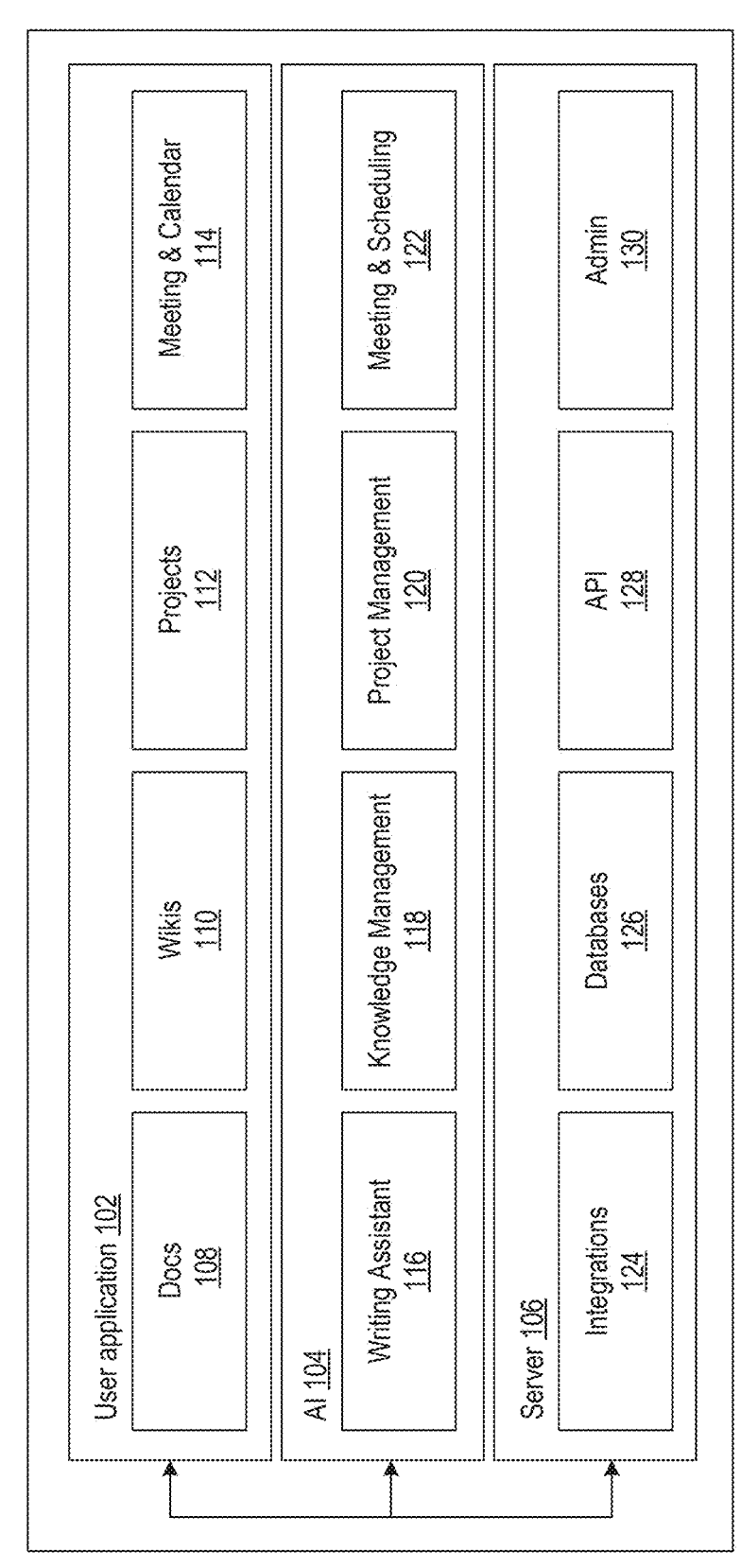
FIG. 1 is a block diagram of an example platform.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method present content in multiple tabs for scroll-free viewing on a mobile device. The system receives an indication to create multiple tabs in a GUI. The system creates a hierarchical data structure including a root node, a parent node, and child node A, where the hierarchical data structure represents the multiple tabs associated with multiple permissions. A permission associated with a tab defines one or more users having access to the tab. The root node represents the multiple tabs, and child node A associated with the root node represents the tab among the multiple tabs. The child node A inherits a permission associated with the parent node.

The processor creates the multiple tabs in the GUI, where the multiple tabs are visible without scrolling on a mobile device screen. The processor receives an indication of content to include in the tab among the multiple tabs and creates the child node B including the content by formatting the content to be visible without scrolling on the mobile device screen. The child node A is a parent of child node B including the content. The processor provides the multiple tabs and the content in the GUI, where viewing the multiple tabs and the content on the mobile device screen includes selecting the tab among the multiple tabs, without scrolling horizontally or vertically through the GUI.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and can move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children is referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into Transaction-Queue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the saveTransactions API endpoint.

Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from Message-Store using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, and a meeting and calendar template 114. In some implementations, a user can generate, save, and share customized templates with other users.

The user application 102 templates can be based on content "blocks." For example, the templates of the user application 102 include a predefined and/or pre-organized set of blocks that can be customized by the user. A block, or a block data structure, is a content container within a template that can include text, images, objects, tables, maps, tabs, and/or other pages (e.g., nested pages or sub-pages). A collection of blocks is also a block. Blocks can be assigned certain properties. The blocks are defined by screen boundaries having dimensions. The screen boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, databases 126, an API 128, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the databases 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
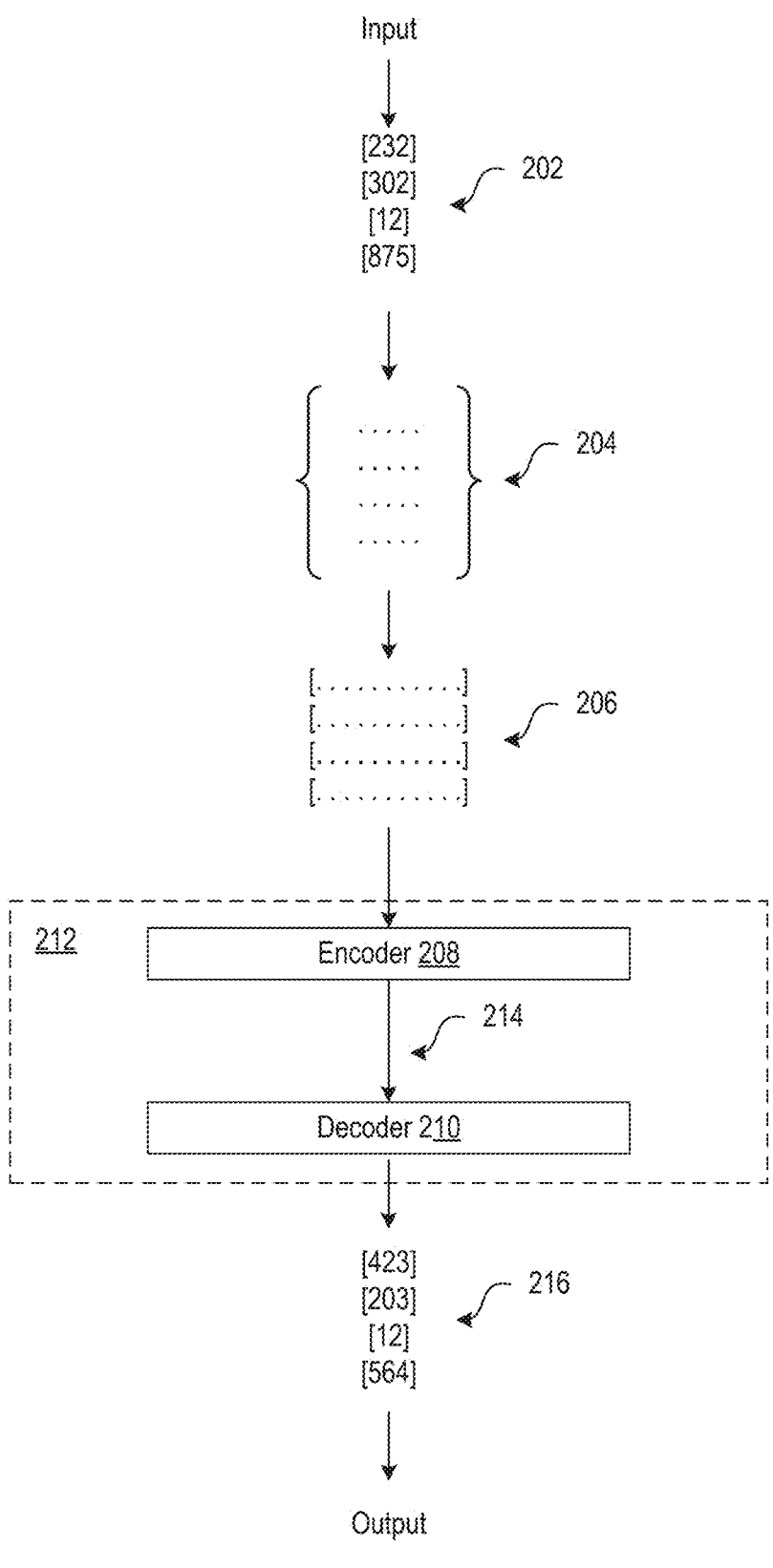
FIG. 2 is a block diagram of an example transformer.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

An input to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organization of Pages in a Workspace

Figure 3:
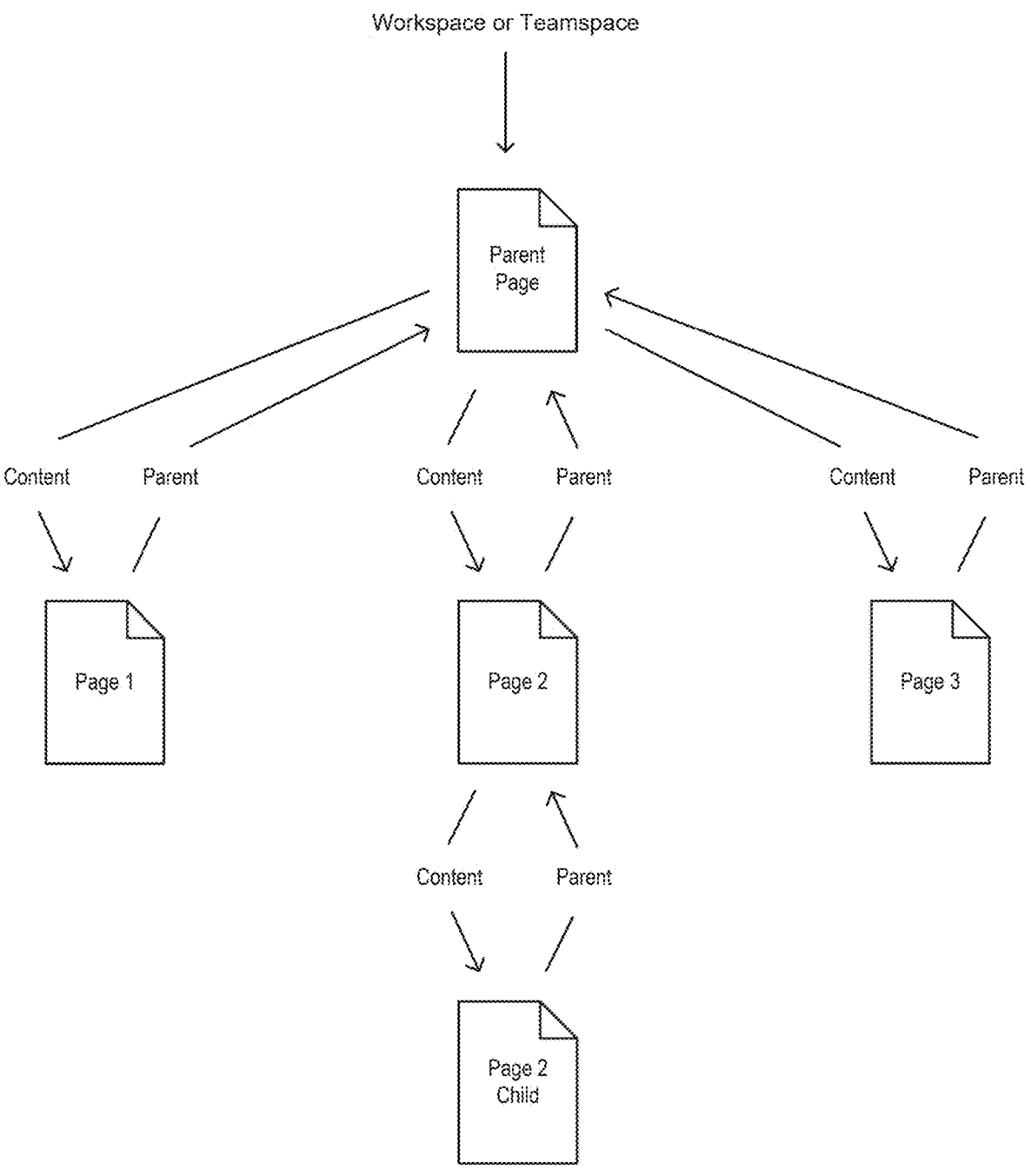
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc. A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three child pages (e.g., "Page 1," "Page 2," and "Page 3"). Each of the child pages can further include sub-pages (e.g., "Page 2 Child," which is a grandchild of "Parent Page" and a child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be changed by changing the location of the pages. For example, when a child page is moved to be under a different parent, the child page's access permission changes to correspond to the access permission of the new parent. Also, when the access permission of "Parent Page" is changed, the access permission of "Page 1," "Page 2," and "Page 3" can be automatically changed to correspond to the access permission of "Parent Page" based on the inheritance character of access permissions.

In contrast, however, a user can change the access permission of the children independently of their parents. For example, the user can change the access permission of "Page 2 Child" in FIG. 3 so that it is different from the access permission of "Page 2" and "Parent Page." The access permission of "Page 2 Child" can be changed to be broader or narrower than the access permission of its parents. As an example, "Page 2 Child" can be shared on the Internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be changed from the previous description. For example, the access permissions of all the pages (parent and children) can be defined as independently changeable.

Presenting Content in Multiple Tabs for Scroll-Free Viewing on a Mobile Device

Figure 4:
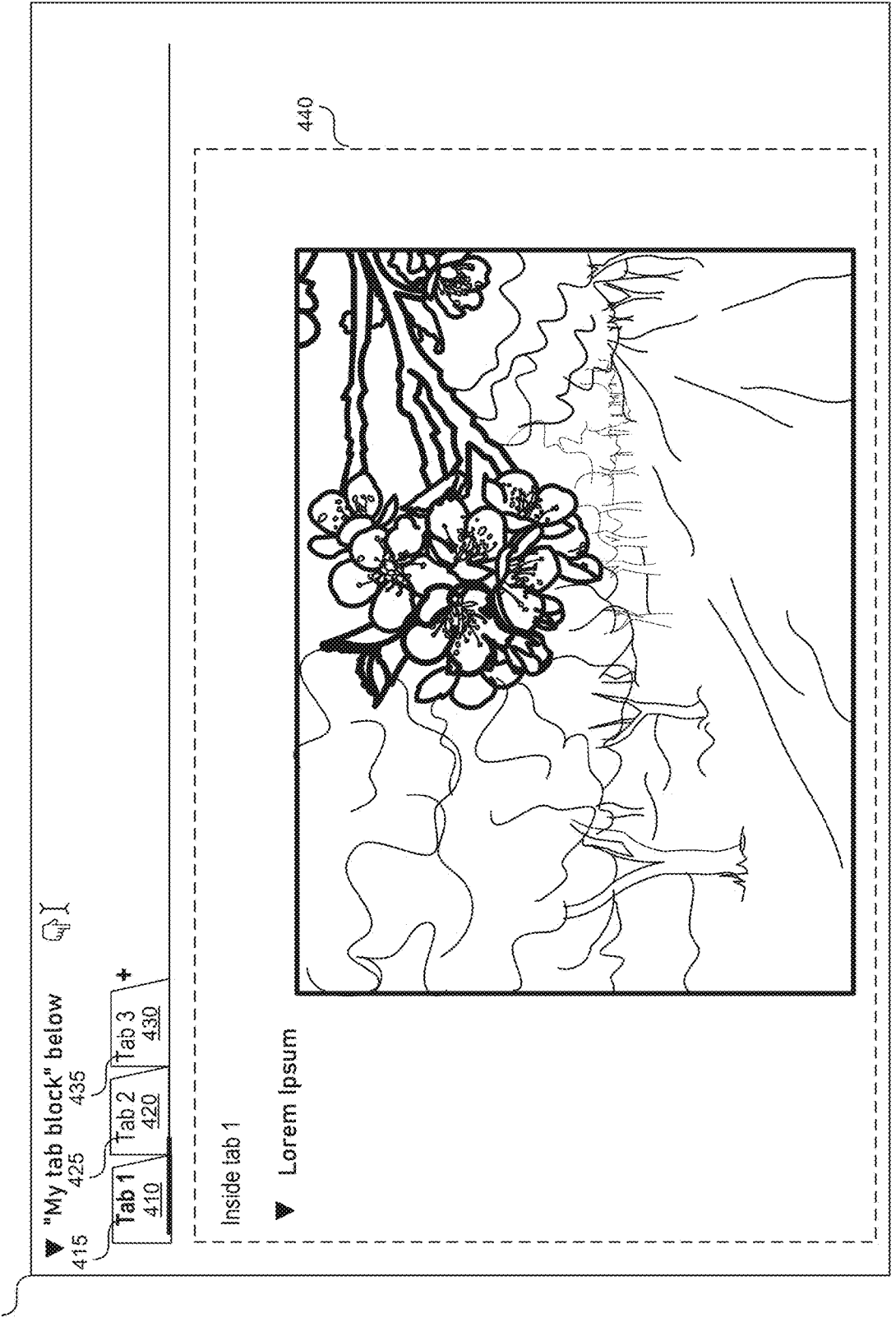
FIG. 4 shows multiple tabs in a graphical user interface (GUI).

FIG. 4 shows multiple tabs in a GUI. The GUI 400 represents the multiple tabs 410, 420, 430 using tab titles 415, 425, 435 that do not occupy much screen space. The GUI 400 can show the content 440 of one tab 410, without showing the contents of the other tabs 420, 430. The advantage of representing content in the form of multiple tabs 410, 420, 430 is that the content can be efficiently represented on a small display screen such as that of a mobile device.

For example, a table which contains multiple columns when presented on a display screen of a mobile device would require the user to scroll sideways to view the content of all the columns. By contrast, the multiple tabs 410, 420, 430 can represent the same information in tab format, where each tab corresponds to a single column in the table. In that case, the tab titles 415, 425, 435 can indicate the content of each tab by, for example, including informative names such as the titles of the corresponding columns in the table. The single tab can include a single column that can fit on the display screen of the mobile device, without requiring the user to scroll sideways or up and down. If the user wants to see the next column, the user can select the next tab.

The content 440 of a tab 410, 420, 430 can be any block such as a text block, an image block, a bulleted list block, a number block, a code block, a toggle list block, etc. In addition, the content 440 can also include multiple tabs, thus creating a nested tab data structure.

Figure 5:
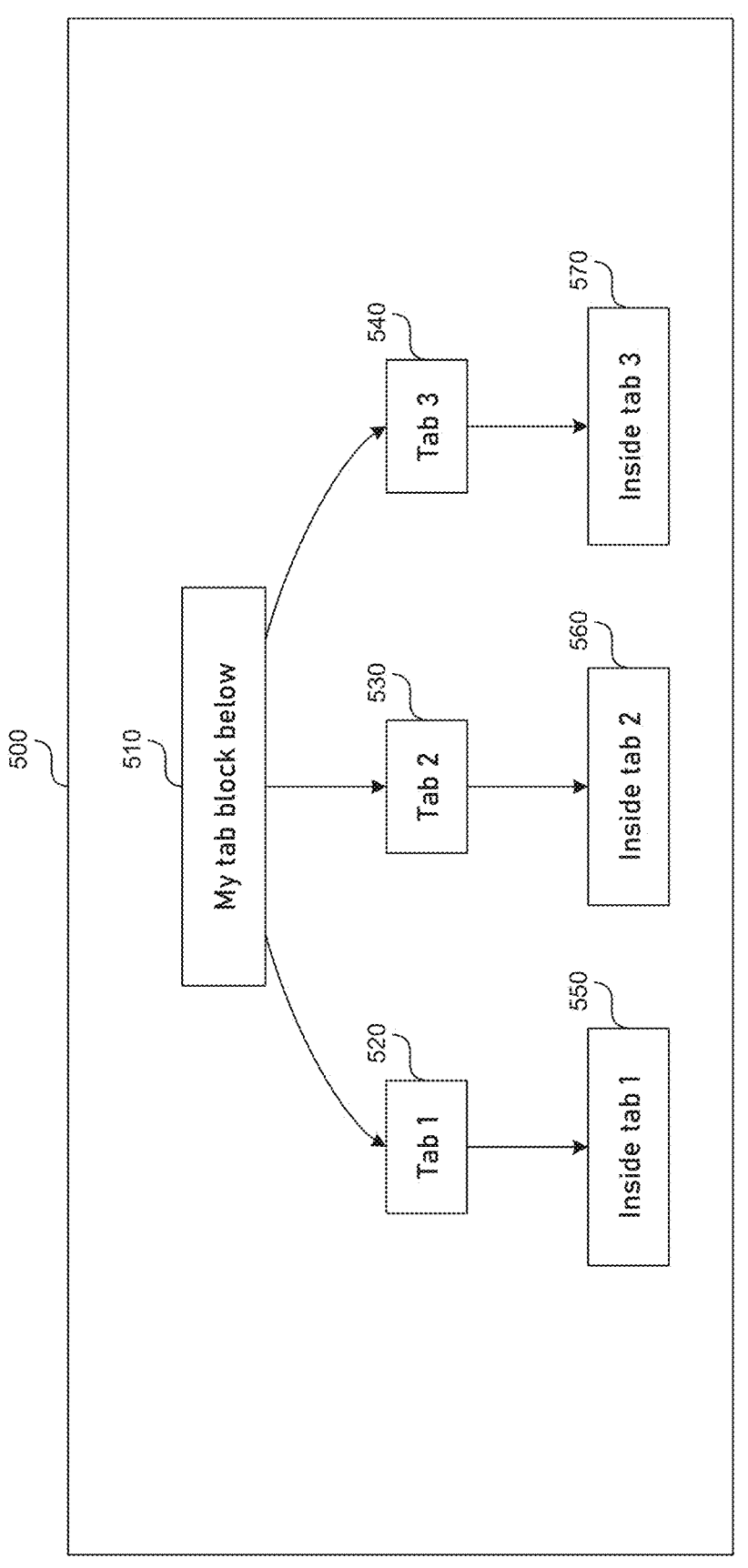
FIG. 5 shows the hierarchical data structure representing the tabs.

FIG. 5 shows the hierarchical data structure representing the tabs. The data structure 500 is a hierarchical data structure with a root node 510 representing the multiple tabs 410, 420, 430 in FIG. 4. The child nodes 520, 530, 540 each correspond to a single tab 410, 420, 430, respectively. The child nodes 550, 560, 570 can correspond to contents of the tab. Each child node 550, 560, 570 can have a corresponding parent node 520, 530, 540, respectively. As described in this application, each child node 520, 530, 540, 550, 560, 570 inherits permissions from the parent; however, that permission can be modified to be more restrictive or to be more permissive.

The child nodes 550, 560, 570 can also include tabs, thus creating a nested tab structure. If a tab 410, 420, 430 includes nested tabs, the tab can include a visual indication of the nested tab contents.

Figure 6:
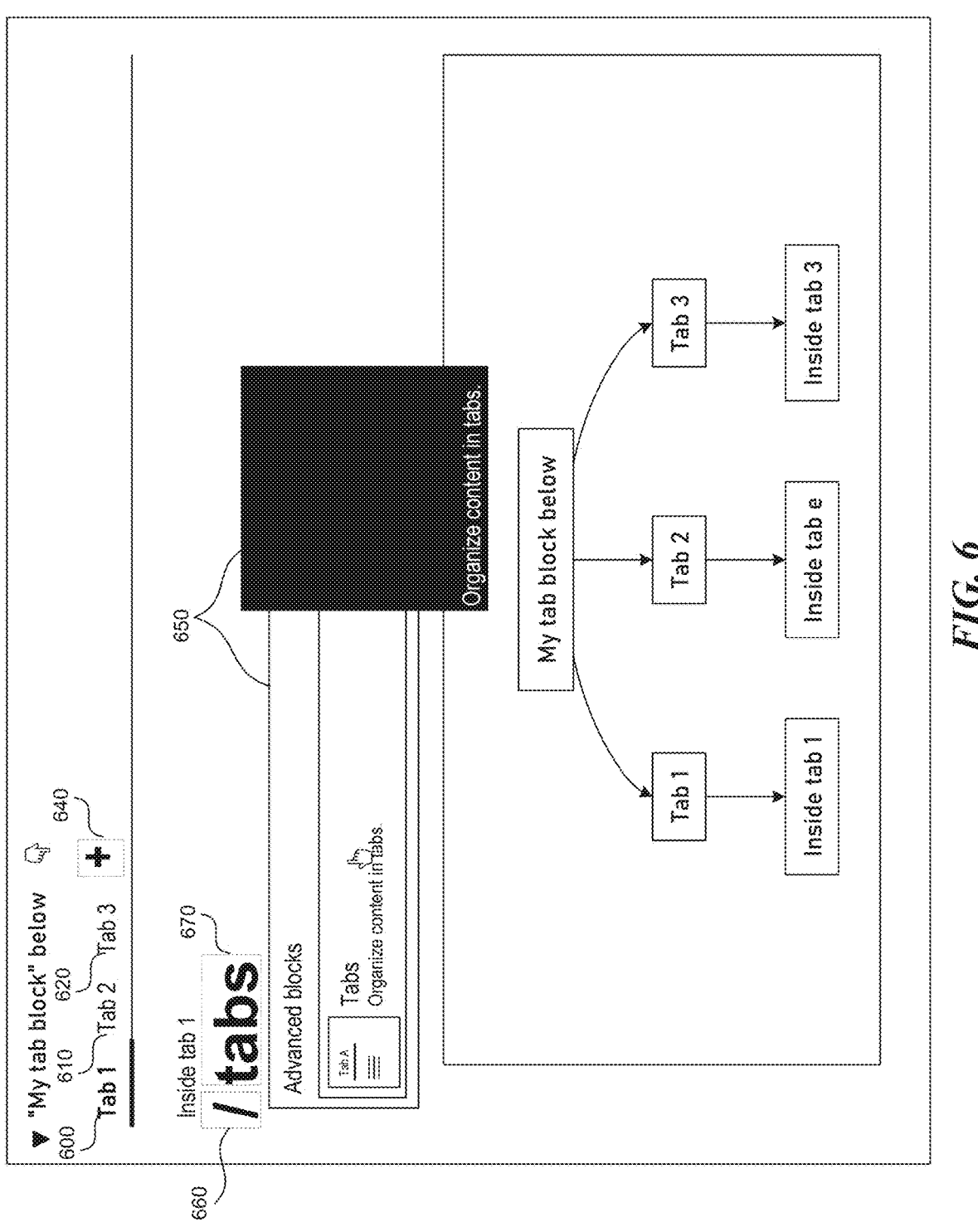
FIG. 6 shows a command line to generate multiple tabs.

FIG. 6 shows a command line to generate multiple tabs. To create multiple tabs 600, 610, 620, the user can type in a special character 660 such as "/" to indicate that a command line 670 follows. If the command line 670 states "tabs", the system can generate multiple tabs 600, 610, 620. The system can generate a default number of tabs, such as three tabs. The selection of the user element 640 indicates to the system to add additional tabs.

In addition to generating the multiple tabs 600, 610, 620, once the system receives the command line 670, the system can provide a help message 650 indicating to the user the function of the command line 670.

Figure 7:
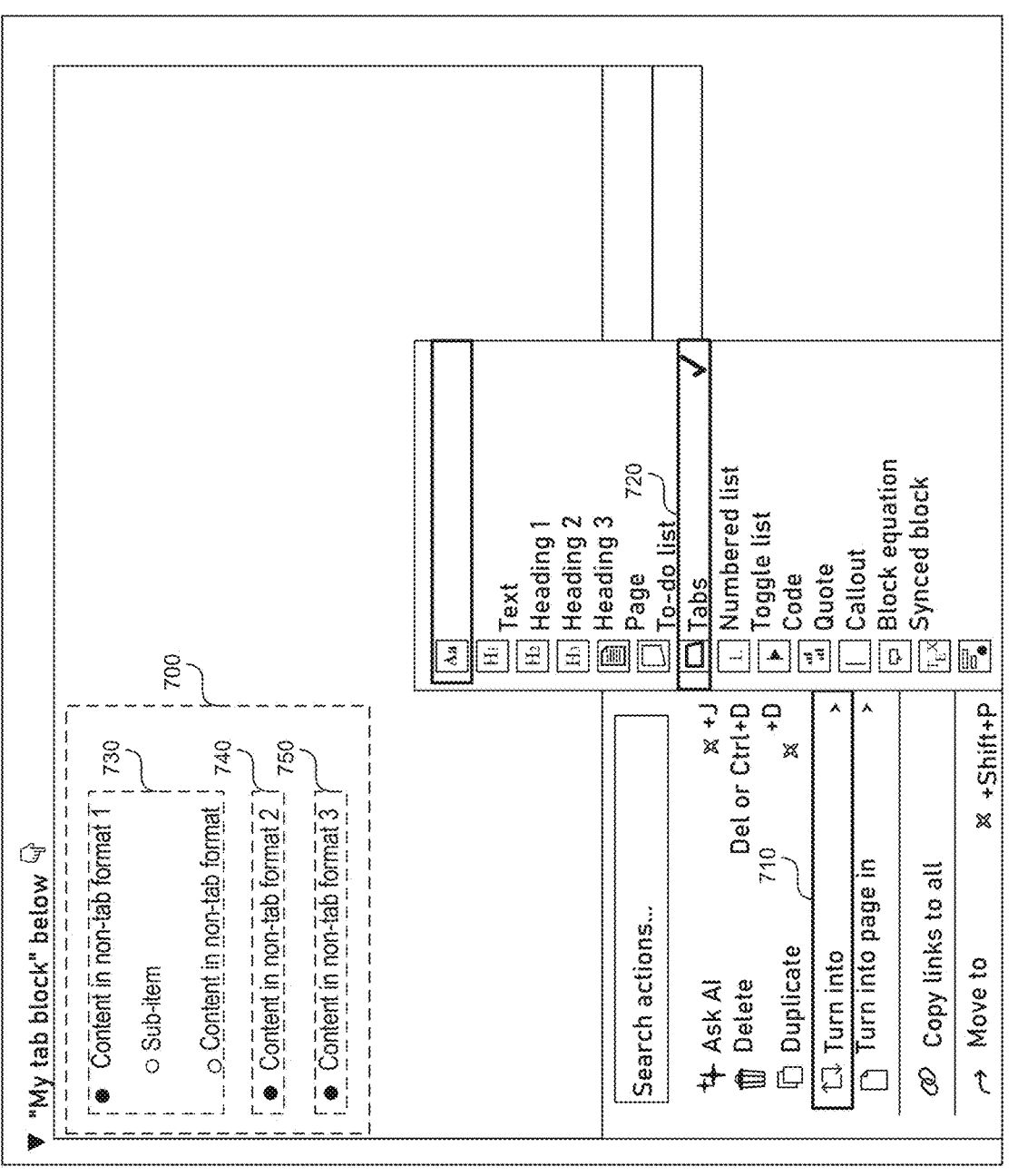
FIG. 7 shows a process to convert a different content format into multiple tabs.

FIG. 7 shows a process to convert a different content format into multiple tabs. The different content format 700 can include any block such as a text block, an image block, a bulleted list block, a number block, a code block, a toggle list block, etc. In other words, the different content format 700 can include any other format different from the multiple tabs. The system can receive an indication 710 to convert the different content format 700 into another content format 720, such as multiple tabs.

The system can determine multiple groups 730, 740, 750 associated with the different content format 700. For example, if the different content format 700 is a bulleted list, the first level bullets can represent multiple groups 730, 740, 750. Specifically, one first level bullet can correspond to one group. In another example, if the different content format 700 is unstructured text, a paragraph in the text can correspond to one group. In a third example, if the different content format 700 is an image, a single image can correspond to a single group.

Once the system determines the multiple groups 730, 740, 750, the system can convert one group among the multiple groups 730, 740, 750 into one tab. The number of tabs can be the same as the number of multiple groups 730, 740, 750.

Figure 8A:
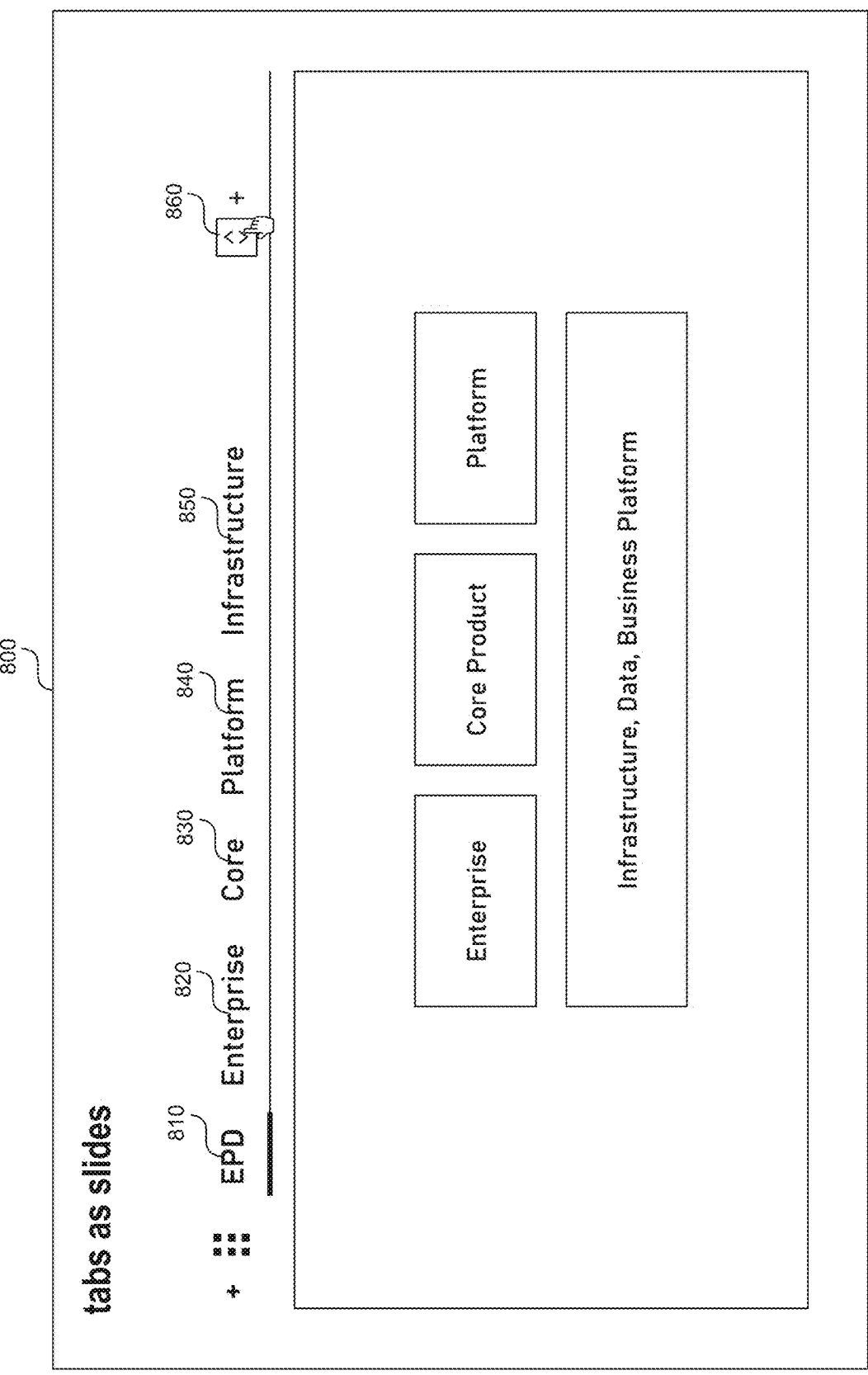
FIGS. 8A-8B show a process to present multiple tabs as a slideshow formatted to work on a mobile device.
Figure 8B:
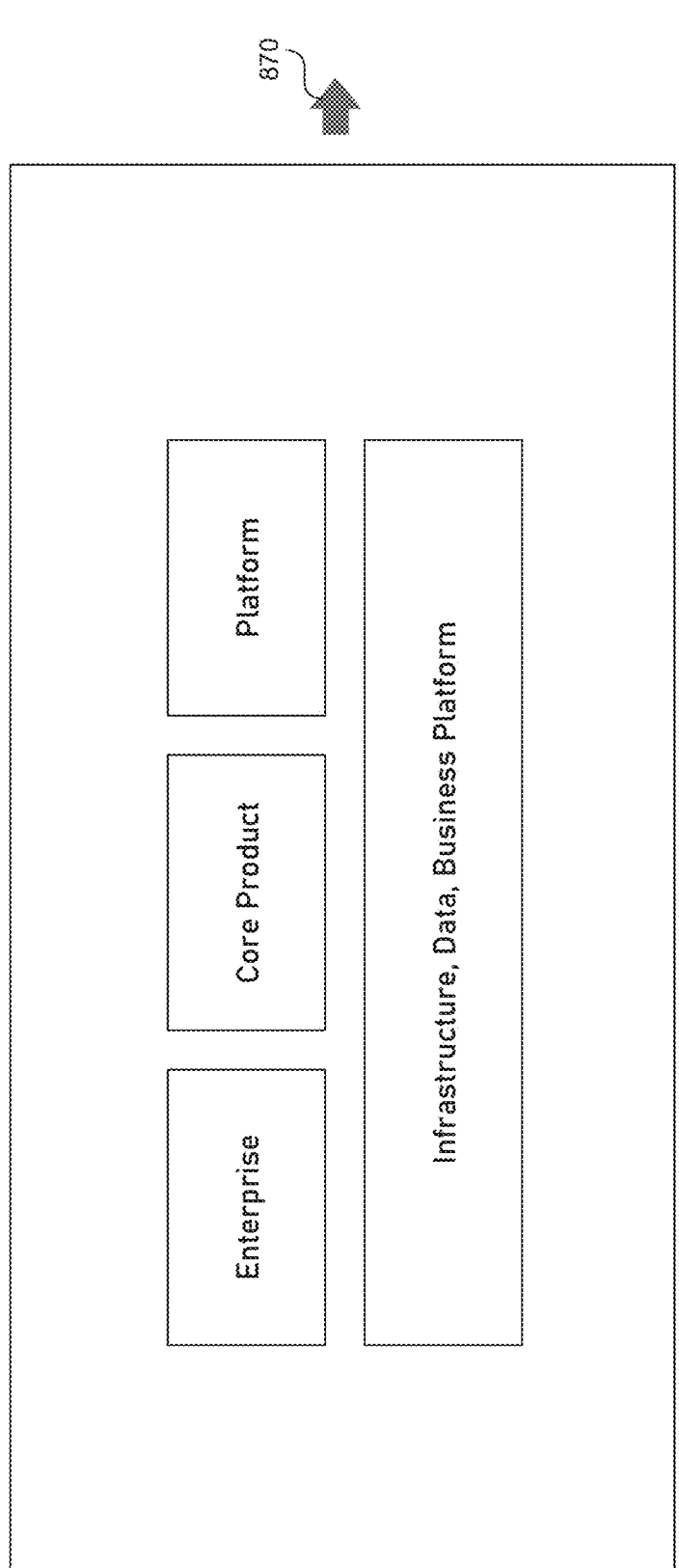

FIGS. 8A-8B show a process to present multiple tabs as a slideshow formatted to work on a mobile device. The user interface 800 of FIG. 8A can represent multiple tabs 810, 820, 830, 840, 850, and a selectable user interface element 860. Once the user interface element 860 is selected, the user interface 800 can present the multiple tabs as a slideshow as shown in FIG. 8B. For example, the content of each of the multiple tabs 810, 820, 830, 840, 850 can take up the full screen of the mobile device when in the slideshow mode as shown in FIG. 8B. The system can advance the slideshow when a user selects the user interface element 870.

The system can format the content of each tab 810, 820, 830, 840, 850 to fit on a display screen of a mobile device. For example, the system can adjust the spacing, the font, and the layout to fit the device display screen, whether the device display screen is a large monitor, or a small display screen of the mobile device. In a more specific example, the system can determine the aspect ratio of the content of the tab 810, 820, 830, 840, 850, and can obtain the asset ratio of the display device. If the aspect ratios are different, the system can change the layout of the content of the tab 810, 820, 830, 840, 850, by for example laying out a single long column into multiple columns. Alternatively, if the aspect ratios are different, the system can crop the content from the single tab 810, 820, 830, 840, 850, and create multiple tabs, where the content of each of the multiple tabs can fit within the display screen of the mobile device.

FIG. 9 is a flowchart of a method to present content in multiple tabs for scroll-free viewing on a mobile device. A hardware or a software processor executing instructions described in this application can, in step 900, receive an indication to create multiple tabs in a GUI.

In step 910, the processor can create a hierarchical data structure including a root node and a first child node, where the hierarchical data structure represents the multiple tabs associated with multiple permissions. The root node can represent the multiple tabs. The first child node associated with the root node can represent a tab among the multiple tabs. The first child node can inherit a property from the root node, such as a permission, screen position, boundary visibility, etc. Both of the root node and the child node can be a block data structure, as described in this application. The block data structure can be defined by screen boundaries having predetermined dimensions configured to visible without scrolling on a screen.

In step 920, the processor can create the multiple tabs in the GUI, where the multiple tabs are visible without scrolling horizontally or vertically on a screen.

In step 930, the processor can receive an indication of content to include in the tab among the multiple tabs. The content can include unstructured text, structured text images such as a bulleted list, toggle list, table, image, video, audio, Internet link, link to a block within the workspace, etc.

In step 940, the processor can create a second child node including the content to include in the tab by formatting the content to be visible without scrolling on the mobile device screen, where the first child node associated with the root is a parent of the second child node including the content of the tab. To format the content, the processor can format the content into multiple tabs. For example, if the content includes a table, the processor can include each column in one tab. In another example, if the content has an aspect ratio different from the aspect ratio of the display device, such as by a factor of 1.5 or more, the processor can break the content down into multiple contents, where each content has an aspect ratio within a desired factor, e.g., 1.5, of the aspect ratio of the display device. In a third example, the processor can change the aspect ratio of the content by laying out the content horizontally, or vertically, and including the content in a single tab.

In step 950, the processor can provide the multiple tabs and the content of the tab in the GUI, where viewing the multiple tabs and the content of the tab on a screen including the mobile device screen includes selecting the tab among the multiple tabs, without scrolling horizontally or vertically through the GUI. Each tab can provide a title indicative of the content in the tab, thus enabling the user to select the tab most relevant to the user.

The processor can create a slideshow presentation based on the multiple tabs. The processor can provide a first selectable user interface element, and receive a selection of the first selectable user interface element indicating to create a slideshow presentation associated with the multiple tabs. The processor can create the slideshow presentation associated with the multiple tabs, where a slide in the slideshow presentation represents the content of the tab. The slideshow presentation can include a second selectable user interface element configured to advance the slideshow presentation to a next slide. Viewing the slideshow presentation and the content of the tab on the screen includes selecting the first selectable user interface element and/or the second selectable user interface element, without scrolling horizontally or vertically through the GUI.

Receiving the indication to create the multiple tabs can include receiving an input of a special character, e.g., "/", where the special character is a precursor of a command line. The processor can receive the command line, e.g., "tabs", following the special character, where the command line indicates to create the multiple tabs. The processor can create the multiple tabs including a default number of tabs, such as three tabs.

Receiving the indication to create the multiple tabs can include receiving a second content in a format different from the multiple tabs, such as a list format. The processor can receive an indication to turn the second content into the multiple tabs, such as by selecting a "turn into" menu option. The processor can determine multiple groups associated with the second content, such as bullets in the bulleted list, headings in the documents, paragraphs in a document, columns in a table, etc. The processor can create the multiple tabs based on the multiple groups, where the tab among the multiple tabs corresponds to a group among the multiple groups.

Receiving the indication to create the multiple tabs can include providing a natural language input to an AI assistant indicating to create the multiple tabs. The processor can obtain the multiple tabs in the GUI.

The processor can receive a second content in a format different from the multiple tabs, such as a list. The processor can receive a natural language input indicating to turn the second content into the multiple tabs. The natural language input can specify "create this data in tab format", where "this data" is selected and/or included in the prompt. Alternatively, the natural language input can state "present this data for mobile display." The processor can determine multiple groups associated with the second content. The processor can create the multiple tabs based on the multiple groups, where the tab among the multiple tabs corresponds to a group among the multiple groups.

The processor can create the hierarchical data structure including a parent node and a child node, where the hierarchical data structure represents the multiple tabs associated with multiple permissions. A permission among the multiple permissions associated with a tab among the multiple tabs can define one or more users having access to the tab. The root node can represent the multiple tabs, and the child node associated with the root node can represent the tab among the multiple tabs. The parent node can include the root node, and the child node can include the first child node and the second child node. The child node can inherit a permission associated with the parent node. The processor can receive an input indicating to change a permission associated with the child node to be different from the permission associated with the parent node, where the permission associated with the child node allows access to more users than the permission associated with the parent node. The processor can update the permission associated with the child node based on the input.

Computer System

Figure 10:
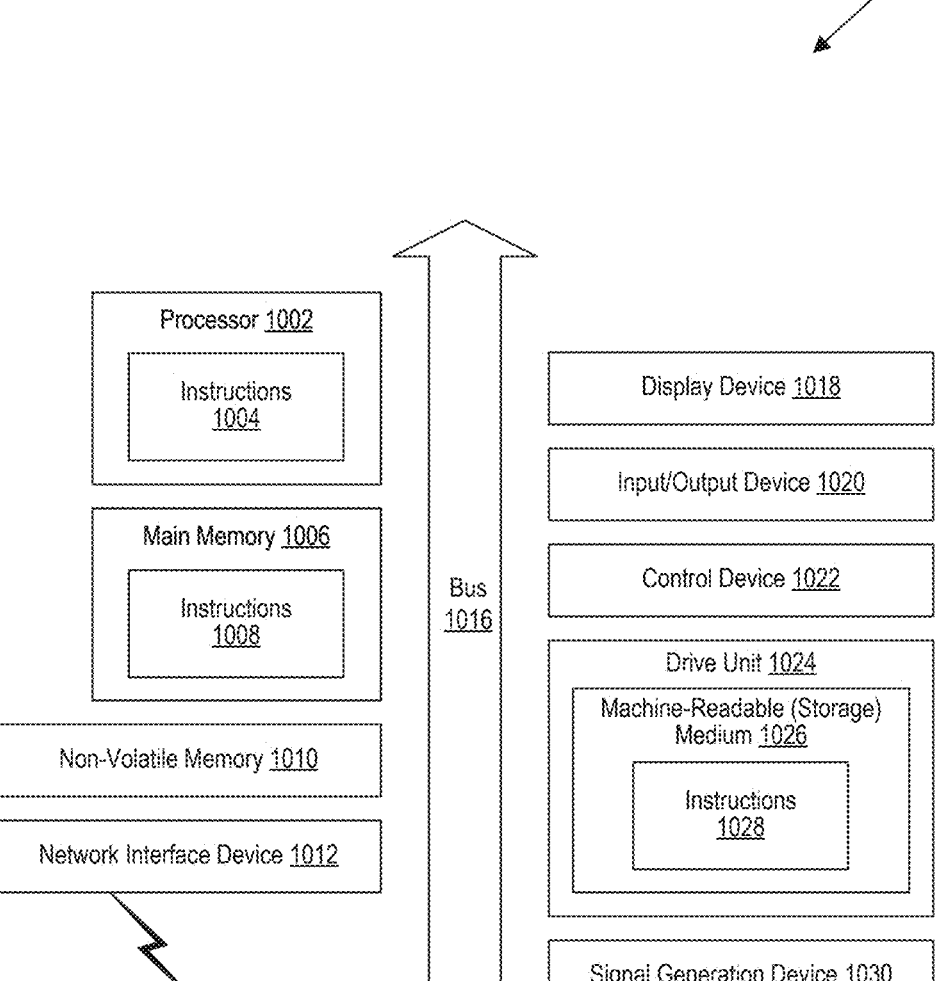
FIG. 10 is a block diagram that illustrates an example of a computer system 1000 in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the Figures and any other components described in this specification can be implemented.

The computer system 1000 can take any suitable physical form. For example, the computer system 1000 can share a similar architecture as that of a server computer, personal computer (PC), tablet computer, mobile telephone, wearable electronic device, network-connected ("smart") device (e.g., a television or home assistant device), augmented reality/ virtual reality (AR/VR) system (e.g., head-mounted display), or any electronic device capable of executing a set of instructions that specify action(s) to be taken by the computer system 1000. In some implementations, the computer system 1000 can be an embedded computer system, a system-on-chip (SOC), a single-board computer (SBC) system, or a distributed system such as a mesh of computer systems or include one or more cloud components in one or more networks. Where appropriate, one or more computer systems 1000 can perform operations in real time, near real time, or in batch mode.

The network interface device 1012 enables the computer system 1000 to mediate data in a network 1014 with an entity that is external to the computer system 1000 through any communication protocol supported by the computer system 1000 and the external entity. Examples of the network interface device 1012 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/ or associated caches and servers) that store one or more sets of instructions 1028. The machine-readable medium 1026 can include any medium that is capable of storing, encoding, or carrying a set of instructions for execution by the computer system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A non-transitory, computer-readable storage medium comprising instructions recorded thereon, wherein the instructions, when executed by at least one data processor of a system, cause the system to:

receive an indication to create multiple tabs in a graphical user interface;

create a hierarchical data structure including a root node and a first child node, wherein the hierarchical data structure represents the multiple tabs associated with multiple permissions, wherein a permission among the multiple permissions associated with a tab among the multiple tabs defines one or more users having access to the tab, wherein the root node represents the multiple tabs, wherein the first child node associated with the root node represents the tab among the multiple tabs, and wherein the first child node inherits a permission associated with the root node;

create the multiple tabs in the graphical user interface, wherein the multiple tabs are visible without scrolling on a mobile device screen;

receive an indication of content to include in the tab among the multiple tabs;

create a second child node including the content by formatting the content to be visible without scrolling on the mobile device screen, wherein the first child node associated with the root node is a parent of the second child node including the content; and provide the multiple tabs and the content in the graphical user interface, wherein viewing the multiple tabs and the content on a screen including the mobile device screen includes selecting the tab among the multiple tabs, without scrolling through the graphical user interface.

2. The non-transitory, computer-readable storage medium of claim 1, comprising instructions to:

provide a first selectable user interface element;

receive a selection of the first selectable user interface element indicating to create a slideshow presentation associated with the multiple tabs; and create the slideshow presentation associated with the multiple tabs, wherein a slide in the slideshow presentation represents the content to include in the tab, wherein the slideshow presentation includes a second selectable user interface element configured to advance the slideshow presentation to a next slide, and wherein viewing the slideshow presentation and the content to include in the tab on the screen including the mobile device screen includes selecting the first selectable user interface element and/or the second selectable user interface element, without scrolling through the graphical user interface.

3. The non-transitory, computer-readable storage medium of claim 1, wherein the instructions to receive the indication to create the multiple tabs comprise instructions to:

receive an input of a special character, wherein the special character is a precursor of a command line;

receive the command line following the special character, wherein the command line indicates to create the multiple tabs; and create the multiple tabs including a default number of tabs.

4. The non-transitory, computer-readable storage medium of claim 1, wherein the instructions to receive the indication to create the multiple tabs comprise instructions to:

receive a second content in a format different from the multiple tabs;

receive an indication to turn the second content into the multiple tabs;

determine multiple groups associated with the second content; and create the multiple tabs based on the multiple groups, wherein the tab among the multiple tabs corresponds to a group among the multiple groups.

5. The non-transitory, computer-readable storage medium of claim 1, wherein the instructions to receive the indication to create the multiple tabs comprise instructions to:

provide a natural language input to an artificial intelligence (AI) assistant indicating to create the multiple tabs; and obtain the multiple tabs in the graphical user interface.

6. The non-transitory, computer-readable storage medium of claim 1, comprising instructions to:

receive a second content in a format different from the multiple tabs;

receive a natural language input indicating to turn the second content into the multiple tabs;

determine multiple groups associated with the second content; and create the multiple tabs based on the multiple groups, wherein the tab among the multiple tabs corresponds to a group among the multiple groups.

7. The non-transitory, computer-readable storage medium of claim 1, comprising instructions to:

create the hierarchical data structure including a parent node and a child node, wherein the hierarchical data structure represents the multiple tabs associated with the multiple permissions, wherein a permission among the multiple permissions associated with the tab among the multiple tabs defines the one or more users having access to the tab, wherein the child node inherits a permission associated with the parent node, and wherein the parent node includes the root node, and the child node includes the first child node and the second child node;

receive an input indicating to change a permission associated with the child node to be different from the permission associated with the parent node, wherein the permission associated with the child node allows access to more users than the permission associated with the parent node; and update the permission associated with the child node based on the input.

8. A method comprising:

receiving an indication to create multiple tabs in a user interface;

creating a hierarchical data structure including a root node and a first child node, wherein the root node represents the multiple tabs, and wherein the first child node associated with the root node represents a tab among the multiple tabs, wherein the first child node inherits a property from the root node, wherein the root node belongs to a block data structure and the first child node belongs to the block data structure, wherein the block data structure is defined by screen boundaries having predetermined dimensions configured to be visible without scrolling on a screen;

creating the multiple tabs in the user interface, wherein the multiple tabs are visible without scrolling on the screen;

receiving an indication of content to include in the tab among the multiple tabs;

creating a second child node including the content by formatting the content to be visible without scrolling on the screen, wherein the first child node associated with the root node is a parent of the second child node including the content; and providing the multiple tabs and the content in the user interface, wherein viewing the multiple tabs and the content on a screen includes selecting the tab among the multiple tabs, without scrolling through the user interface.

9. The method of claim 8, comprising:

providing a first selectable user interface element;

receiving a selection of the first selectable user interface element indicating to create a slideshow presentation associated with the multiple tabs; and creating the slideshow presentation associated with the multiple tabs, wherein a slide in the slideshow presentation represents the content to include in the tab, wherein the slideshow presentation includes a second selectable user interface element configured to advance the slideshow presentation to a next slide, and wherein viewing the slideshow presentation and the content to include in the tab on the screen includes selecting the first selectable user interface element and/or the second selectable user interface element, without scrolling through the user interface.

10. The method of claim 8, wherein receiving the indication to create the multiple tabs comprises:

receiving an input of a special character, wherein the special character is a precursor of a command line;

receiving the command line following the special character, wherein the command line indicates to create the multiple tabs; and creating the multiple tabs including a default number of tabs.

11. The method of claim 8, wherein receiving the indication to create the multiple tabs comprises:

receiving a second content in a format different from the multiple tabs;

receiving an indication to turn the second content into the multiple tabs;

determining multiple groups associated with the second content; and creating the multiple tabs based on the multiple groups, wherein the tab among the multiple tabs corresponds to a group among the multiple groups.

12. The method of claim 8, wherein receiving the indication to create the multiple tabs comprises:

providing a natural language input to an artificial intelligence (AI) assistant indicating to create the multiple tabs; and obtaining the multiple tabs in the user interface.

13. The method of claim 8, comprising:

receiving a second content in a format different from the multiple tabs;

receiving a natural language input indicating to turn the second content into the multiple tabs;

determining multiple groups associated with the second content; and creating the multiple tabs based on the multiple groups, wherein the tab among the multiple tabs corresponds to a group among the multiple groups.

14. A system comprising:

at least one hardware processor; and at least one non-transitory memory storing instructions, which, when executed by the at least one hardware processor, cause the system to:

receive an indication to create multiple tabs in a user interface;

create a hierarchical data structure including a root node and a first child node, wherein the root node represents the multiple tabs, wherein the first child node associated with the root node represents a tab among the multiple tabs, wherein the root node belongs to a block data structure and the first child node belongs to the block data structure, wherein the block data structure is defined by screen boundaries having predetermined dimensions configured to be visible without scrolling on a screen;

create the multiple tabs in the user interface, wherein the multiple tabs are visible without scrolling on a screen;

receive an indication of content to include in the tab among the multiple tabs;

create a second child node including the content by formatting the content to be visible without scrolling on the screen, wherein the first child node associated with the root node is a parent of the second child node including the content; and provide the multiple tabs and the content in the user interface, wherein viewing the multiple tabs and the content on the screen includes selecting the tab among the multiple tabs, without scrolling through the user interface.

15. The system of claim 14, comprising instructions to:

provide a first selectable user interface element;

receive a selection of the first selectable user interface element indicating to create a slideshow presentation associated with the multiple tabs; and create the slideshow presentation associated with the multiple tabs, wherein a slide in the slideshow presentation represents the content to include in the tab, wherein the slideshow presentation includes a second selectable user interface element configured to advance the slideshow presentation to a next slide, and wherein viewing the slideshow presentation and the content to include in the tab on the screen includes selecting the first selectable user interface element and/or the second selectable user interface element, without scrolling through the user interface.

16. The system of claim 14, wherein the instructions to receive the indication to create the multiple tabs comprise instructions to:

receive an input of a special character, wherein the special character is a precursor of a command line;

receive the command line following the special character, wherein the command line indicates to create the multiple tabs; and create the multiple tabs including a default number of tabs.

17. The system of claim 14, wherein the instructions to receive the indication to create the multiple tabs comprise instructions to:

receive a second content in a format different from the multiple tabs;

receive an indication to turn the second content into the multiple tabs;

determine multiple groups associated with the second content; and create the multiple tabs based on the multiple groups, wherein the tab among the multiple tabs corresponds to a group among the multiple groups.

18. The system of claim 14, wherein the instructions to receive the indication to create the multiple tabs comprise instructions to:

provide a natural language input to an artificial intelligence (AI) assistant indicating to create the multiple tabs; and obtain the multiple tabs in the user interface.

19. The system of claim 14, comprising instructions to:

receive a second content in a format different from the multiple tabs;

receive a natural language input indicating to turn the second content into the multiple tabs;

determine multiple groups associated with the second content; and create the multiple tabs based on the multiple groups, wherein the tab among the multiple tabs corresponds to a group among the multiple groups.

20. The system of claim 14, comprising instructions to:

create the hierarchical data structure including a parent node and a child node, wherein the hierarchical data structure represents the multiple tabs associated with multiple permissions, wherein a permission among the multiple permissions associated with the tab among the multiple tabs defines one or more users having access to the tab, wherein the child node inherits a permission associated with the parent node, and wherein the parent node includes the root node, and the child node includes the first child node and the second child node;

receive an input indicating to change a permission associated with the child node to be different from the permission associated with the parent node, wherein the permission associated with the child node allows access to more users than the permission associated with the parent node; and update the permission associated with the child node based on the input.

\* \* \* \* \*